United States Patent Office 3,313,726
Patented Apr. 11, 1967

3,313,726
PROCESS FOR REGENERATING ION EXCHANGE RESINS
Charles R. Campbell, Robert Johnson, and Roland R. Spiegelhalter, Pensacola, Fla., assignors to Monsanto Company, a corporation of Delaware
No Drawing. Original application June 24, 1963, Ser. No. 290,190, now Patent No. 3,152,186. Divided and this application Aug. 20, 1964, Ser. No. 391,049
12 Claims. (Cl. 210—33)

This invention relates to a process for regenerating strongly acidic cation exchange resins and strongly basic anion exchange resins and is a divisional application of our previous application Ser. No. 290,190, filed in the United States Patent Office on June 24, 1963, now U.S. Patent No. 3,152,186.

The purification of liquid chemicals and liquid solutions of chemicals with strongly acidic cation exchange resins and strongly basic anion exchange resins has been known; however, the use of these materials in commercial purification processes has been deterred greatly because of the inability to regenerate cation and anion exchange resins successfully for extended periods.

An object of the present invention is to provide a process for regenerating strongly basic anion exchange resins. Another object of this invention is to provide a process for regenerating strongly acidic cation exchange resins.

These and other objects will become apparent from the following detailed description and examples.

In accordance with the process of this invention, it has now been found that ion exchange resins, which term shall be used to include strongly basic anion exchange resins and strongly acidic cation exchange resins, can be regenerated to substantially their original ion-exchange capacity when the regeneration thereof is preceded by a defouling step.

The strongly acidic cation exchange resins are well known and include such materials as the free acid of a sulfonated styrene divinylbenzene copolymer. Strongly acidic cation exchange resins are available commercially, and several of those which may be used successfully in accordance with this invention in purification processes are sold under the trademarks and grade designations Dowex 50W (Dow Chemical Company), IR 20 and Amberlite 200 (Rohm & Haas Company), and Permutit K (Permutit Company).

The strongly basic anion exchange resins which may be used in accordance with this invention for purification of chemical streams are generally of the quaternary ammonium hydroxide type such as a styrene divinylbenzene copolymer with quaternary ammonium hydroxide groups on side chains of the aromatic nuclei. Resins such as these are available commercially under the trademarks and grade designations of Dowex 2 and Dow 21K (Dow Chemical Company), IRA-401 (Rohm & Haas Company), and Permutit 51 and Permutit 52 (Permutit Company).

Many other commercial available strongly acidic cation and strongly basic anion exchange resins of the type described above are suitable for the purification of chemical streams. The use of any given ion exchange resin is dependent upon the physical strength of the resin itself and the regenerating and defouling characteristics of a particular chosen one.

Hexamethylenediamine is a well-known compound which may be and is prepared continuously on a commercial scale by catalytically hydrogenating adiponitrile in the presence of ammonia. In this continuous process a high purity adiponitrile is necessary to prevent catalyst poisoning by trace impurities contained in the adiponitrile. A major problem encountered in the commercial manufacture of adiponitrile by well-known processes such as the reaction of adipic acid and ammonia in the presence of certain dehydrogenating catalysts such as the oxides of aluminum, silicon, tungsten, titanium, molybdenum, and the like is that side reactions occur which result in the formation of various impurities which have deleterious effects upon the efficiency, yield, and service life of hydrogenation catalysts in the subsequent hydrogenation of adiponitrile to hexamethylenediamine as well as causing formation of unwanted impurities in the produced hexamethylenediamine. A partial listing of the particular impurities produced in the conversion of adipic acid to adiponitrile is given in our Patent 3,152,186 noted above. It has been found that the treatment of commercially produced adiponitrile alternately with strongly acidic cation exchange resins and strongly basic anion exchange resins on a continuous basis will remove undesired impurities in adiponitrile, and this treatment can be effected successfully when the ion exchange resins are regenerated in accordance with the process of this invention. It is for this process for which this invention will be described although it is clear that the process for regeneration of the strongly acidic cation exchange resins and strongly basic anion exchange resins is clearly applicable to regeneration ion exchange resins used in other processes.

Crude adiponitrile as produced by conventional commercial processes is generally distilled to produce a semi-refined adiponitrile by the removal of at least a major portion of ammonia, water, and by-products resulting from the adiponitrile synthesis. The semi-refined adiponitrile then may be contacted alternately with strongly acidic cation exchange resins and strongly basic anion exchange resins to remove the unwanted acidic and basic impurities therein prior to the subsequent hydrogenation thereof for the production of hexamethylenediamine. As is well-known, acidic and basic impurities in semi-refined adiponitrile may be removed by ion exchange contacting whether the impurities are present in a free state or in a combined state such as salts. It has been found that the continuous liquid phase treatment of semi-refined adiponitrile may be accomplished by contacting the semi-refined adiponitrile alternately with strongly acidic cation exchange resin and strongly basic anion exchange resin arranged in ion exchange resin beds whereby the semi-refined adiponitrile is fed through a cation exchange resin bed first and then an anion exchange resin bed with additional cation and anion exchange resin beds being held on standby or being regenerated for subsequent use depending upon the flow requirements of the process, the size of the resin beds, and other factors well-known to those skilled in the art.

Semi-refined adiponitrile normally is fed to cation and anion exchange resin beds downflow with the flow initiated on the top of a column of an ion exchange resin bed which is flooded with water. The water in the column covering the ion exchange resin is displaced downwardly and replaced with semi-refined adiponitrile being purified by the ion exchange resin in the bed. The flow of the semi-refined adiponitrile through the cation and anion exchange resin beds may be continuous and the flow rate is dependent upon the depth and cross-sectional area of the ion exchange bed and the concentration of the impurities in the semi-refined adiponitrile. Flow rates and sizes of the ion exchange resin beds may be determined to operate a purification process in the most economical manner by means well-known to those skilled in the art.

As is well known, ion exchange capacity of ion exchange resins becomes reduced as the resins are used to remove impurities, and in the process for which this invention is being described.

Cation exchange resin bed exhaustion may vary depending upon the concentration of basic impurities to be removed from the semi-refined adiponitrile and the flow rate thereof through the cation exchange resin bed. In the purification of semi-refined adiponitrile produced by the dehydrogenation of adipic acid in the presence of ammonia, it has been found that the purification effectiveness of a strongly acidic cation exchange resin bed may be reduced sufficiently to require regeneration of the resin in the bed when there has been a volume throughput of adiponitrile of at least 40 to 50 times the volume of the cation exchange resin in the bed.

Anion exchange resin bed exhaustion also may vary depending upon the concentration of the acidic impurities contained in the semi-refined adiponitrile and the flow rate thereof through the strongly basic anion exchange resin bed. In the purification of semi-refined adiponitrile produced by the dehydrogenation of adipic acid in the presence of ammonia, it has been found that the purification effectiveness of a strongly basic anion exchange resin bed may be reduced sufficiently to require regeneration of the resin in the bed when there has been a volume throughput of semi-refined adiponitrile of at least 12 to 20 times the volume of the resin in the bed.

Cation exchange resin bed exhaustion may be monitored by any suitable means such as ultraviolet light scanning of the effluent semi-refined adiponitrile from the cation exchange resin bed column; and when continuous or intermittent ultraviolet light scanning is used, the ultraviolet light may have a wave length of 220 to 280 millimicrons and preferably 250 to 270 millimicrons. The feed of the semi-refined adiponitrile may be changed from an exhausted cation exchange resin column to a second cation exchange resin column, operating in parallel therewith, when the ultraviolet light absorption of the effluent is found to have increased approximately two-fold.

The exhausted cation exchange resin column then may be treated according to the ion exchange resin regeneration process of this invention which comprises displacing the semi-refined adiponitrile in the exhausted cation exchange resin column, reclassification, defouling, and water washing of the cation exchange resin bed, regeneration of the water-washed cation exchange resin, and water wash of the regenerated cation exchange resin, and a final reclassification of the cation exchange resin bed.

The displacement of the semi-refined adiponitrile in the exhausted cation exchange resin column may be accomplished with water flowing concurrent or countercurrent to the normal flow of the semi-refined adiponitrile through the bed. The volume of water used for proper displacement and the rate of flow of the displacing water are not critical; and in a preferred example, water in a volume equal to 1.5 to 2 times the volume of the cation exchange resin in the column may be passed concurrently through the column at a flow rate of two to three gallons per minute per square foot of cross-sectional area of cation exchange resin in the column.

Reclassification of the cation exchange resin bed may be accomplished with water flowing up through the bed and should be continued until there is approximately 100% expansion in the ion exchange resin bed. One or more volumes of water per volume of cation exchange resin may be necessary to accomplish this.

Defouling of the cation exchange resin may be accomplished with a methanol solution of an organic base, an aqueous ammonia solution, or an aqueous ammonia in methanol solution. The concentration of the organic base in the methanol or the ammonia in water or water and methanol may be between 1.5% and 30%, and the flow of the defouling solution may be countercurrent to the normal flow of the semi-refined adiponitrile through the bed at a rate sufficient to remove defouled suspended solids from the cation exchange resin bed and column. In a preferred example, a 1.7% by weight aqueous ammonia solution in a volume three to five times the volume of the cation exchange resin in the bed may be passed countercurrently up through the bed at a rate of 1.5 to 2.5 gallons per minute per square foot of cross-sectional area of resin in the bed. The water wash following defouling may be in the same volume, direction, and flow rate as that of the defouling solution.

The regeneration of the cation exchange resin may be accomplished using an aqueous solution of a mineral acid, and the volume of the regenerating solution necessary is dependent upon the concentration of the mineral acid in the aqueous solution. The concentration of the mineral acid in the aqueous solution may be from 4% to 10% by weight; however, when mineral acid solutions of a concentration less than 4% are used, excessive volumes of these solutions may be required for contacting the bed. If mineral acid solutions of a concentration greater than 10% are used, unnecessary cation exchange resin breakage may result. In a preferred example, an aqueous solution of sulfuric acid, in a concentration of 5% by weight and a volume eight to ten times the volume of the cation exchange resin in the bed, may be passed through the bed concurrent to the normal direction of flow of the semi-refined adiponitrile therethrough at a flow rate of two to three gallons per minute per square foot of cross-sectional area of the cation exchange resin in the bed. Following contacting of the cation exchange resin bed with regenerating solution, the resin bed may be washed with water in a volume, flow direction, and flow rate substantially the same as that used for the regenerating solution.

A final reclassification of the cation exchange resin in the bed may be accomplished by passing water countercurrently up through the bed, in a sufficient volume to provide hydraulic classification of the ion exchange resin. Following the reclassification of the bed, the reclassification water may remain in the bed until such time as it is necessary to use the bed for the cation exchange resin purification of the semi-refined adiponitrile, as described above.

The anion exchange resin exhaustion may be monitored by continuous acidity measurements of the adiponitrile effluent from the anion exchange resin column; and when conductivity, titration, or other acidity measurements show the presence of acid or acids in the effluent, the feed of the semi-refined adiponitrile may be changed from an exhausted anion exchange resin column to a second anion exchange resin column operating in parallel therewith. The exhausted resin column then may be treated according to the ion exchange resin regeneration process of this invention which comprises displacing the semi-refined adiponitrile in the exhausted anion exchange resin column, reclassification, defouling, and water washing of the anion exchange resin bed, regeneration of the water washed anion exchange resin, water wash of the regenerated anion exchange resin, and a final reclassification of the anion exchange resin bed.

The displacement of the semi-refined adiponitrile in the exhausted anion exchange resin column may be accomplished with water. The flow of the displacing water may be concurrent or countercurrent to the normal flow of the semi-refined adiponitrile therethrough. The volume of water used for proper displacement and the rate of flow of the displaced water are not critical; and in a preferred example, water in a volume equal to 1.5 to 2 times the volume of the anion exchange resin in the column may be passed concurrently through the column at a flow rate of two to three gallons per minute per square foot of cross-sectional area of anion exchange resin in the column.

The reclassification of the anion exchange resin bed may be accomplished with water flowing countercurrent to the normal flow of the semi-refined adiponitrile through the bed and should be continued until there is approximately 100% expansion in the ion exchange resin bed. One or more volumes of water per volume of anion exchange resin may be necessary to accomplish this.

Defouling of the anion exchange resin may be accomplished with an aqueous solution of a mineral acid such as hydrochloric, sulfuric, nitric, and others, and the concentration of the mineral acid in the water may be between 2.5% and 10%. The flow of the defouling solution may be countercurrent or concurrent to the normal flow of the semi-refined adiponitrile through the bed at a rate sufficient to remove defouled suspended solids from the anion exchange resin bed and column. In a preferred example, a 2.5%, by weight, aqueous sulfuric acid solution, in a volume of 0.75 to 1.0 times the volume of the anion exchange resin in the bed, may be passed down through the bed at a rate of 1.5 to 2.5 gallons per minute per square foot of cross-sectional area of resin in the bed. The water wash following defouling may be in the same volume, direction, and flow rate as that of the defouling solution.

Defouling of the anion exchange resin may be preceded by a salt treatment, if desired, to minimize the physical breakage of the anion exchange resin which may result from osmotic shock. This salt treatment may be accomplished by contacting the anion exchange resin with a solution of any acidic or neutral salt such as sodium sulfate, ammonium sulfate, sodium chloride, and others; and the concentration of the salt solution and the quantity of salt used to contact the anion exchange resin are dependent upon the theoretical capacity of the anion exchange resin used. In a preferred example, an aqueous solution of ammonium sulfate in a concentration of 1 N and in a quantity sufficient to provide the stoichiometric salt equivalent to the theoretical capacity of the quantity of anion exchange resin in the resin bed may be used.

Regeneration of the anion exchange resin may be accomplished using an aqueous solution of a caustic material such as sodium hydroxide, potassium hydroxide, and other similar materials, and the volume of the regenerating solution necessary is dependent upon the concentration of the caustic in the aqueous solution. The concentration of caustic in the aqueous solution may be from 4% to 10% by weight, however, caustic solutions of less than 4% and greater than 10% may be used, if desired. If caustic solutions of a concentration less than 4% are used, excessive volumes of regenerating solution may be necessary to provide proper regeneration of the anion exchange resin, and if the concentration of the caustic solution is greater than 10%, unnecessary anion exchange resin breakage may result. In a preferred example, an aqueous solution of sodium hydroxide in a concentration of 5%, by weight, and in a volume of seven to ten times the volume of the anion exchange resin in the bed may be passed through the bed concurrent to the direction of the normal flow of the semi-refined adiponitrile therethrough at a flow rate of two to three gallons per minute per square foot of cross-sectional area of the anion exchange resin in the bed. Following contacting of the anion resin bed with regenerating solution, the resin bed may be washed with water in a volume, flow direction, and flow rate substantially the same as that used for the regenerating solution.

Final reclassification of the anion exchange resin in the bed may be accomplished by passing water up through the bed in a volume sufficient to provide hydraulic classification of the anion exchange resin. Following the reclassification of the bed, reclassification water may remain covering the bed until such time as it is necessary to use the bed for the anion exchange resin purification of the semi-refined adiponitrile, as described above.

The following examples illustrate a preferred procedure to be followed in accordance with the process of this invention, however, it should be understood that the examples are illustrative only and not excluding.

*Example I*

A cation exchange resin bed 2" in diameter and 30" deep and containing 1640 milliliters of IR-120 cation exchange resin (IR-120 is the trademark of Rohm and Haas Company for a strongly acidic cation exchange resin) was subjected to ten repetitive semi-refined adiponitrile purification cycles and ten corresponding regeneration cycles. The purification of the adiponitrile through the cation exchange resin bed was terminated when a two-fold increase in the ultraviolet absorption of the cation exchange purified adiponitrile effluent was obtained. The regeneration of the cation exchange resin bed was accomplished using 4.3 volumes of 10% by weight sulfuric acid solution per volume of resin in the bed. The ion exchange purification capacity of the bed for the semi-refined adiponitrile decreased from an initial cycle of 85 volumes of adiponitrile purified per volume of cation exchange resin to 47 volumes of adiponitrile purified per volume of resin for the tenth purification cycle. This corresponds to a 56.5% reduction in the cation exchange resin purification capacity.

*Example II*

A cation exchange resin bed 1.8" in diameter and 30" deep containing 1300 milliliters of IR-120 cation exchange resin (IR-120 is the trademark of Rohm and Haas Company for a strongly acidic cation exchange resin manufactured by them) was subjected to 45 repetitive adiponitrile purification and regeneration cycles. As in Example I, the purification cycles for the adiponitrile were terminated when there was a two-fold increase in the ultraviolet absorption of the cation exchange purified adiponitrile effluent from the bed. The regeneration cycle of the cation exchange resin in this example included a defouling step of the cation exchange resin with sulfuric acid solution prior to regeneration. The defouling step was accomplished by contacting the cation exchange resin with four volumes of 1 N aqueous ammonia solution (1.7% by weight) per volume of cation exchange resin in the bed. The defouling solution was contacted with the cation exchange resin countercurrent to the normal direction of the semi-refined adiponitrile through the bed and was followed by a water wash of the bed in substantially the same volume, direction, and flow rate as that of the defouling solution. The regeneration of the bed was accomplished using 8.5 volumes of a 5% by weight sulfuric acid solution per volume of resin in the bed. The capacity of the cation exchange resin bed to purify adiponitrile decreased from 60 volumes of adiponitrile purified per volume of cation exchange resin for the first purification cycle to 45 volumes of adiponitrile purified per volume of resin in the bed for the forty-fifth cycle. This reduction capacity is equal to a 25% loss in adiponitrile purification capacity for 45 cycles.

A comparison of the results of Example I and Example II shows clearly the advantage of a defouling step in the regeneration process of this invention for ion exchange resins. The adiponitrile purification capacity decrease incurred in regeneration with defouling through 45 cycles was less than half the loss in adiponitrile purification capacity encountered without defouling in the regeneration process in only ten cycles of regeneration.

*Example III*

An anion exchange resin bed 1.8" in diameter and 30" deep and containing 1300 milliliters of IRA-401 (trademark of Rohm and Haas Company for a strongly basic anion exchange resin) was used for the purification of cation exchange purified adiponitrile having an acidity of 1.9 milliequivalents per 100 millimeters. On the initial purification cycle with the anion exchange resin bed, 62.5 volumes of adiponitrile per volume of anion exchange resin were purified before acidity appeared in the adiponitrile effluent from the bed. The anion exchange bed was then regenerated by contacting the bed with 2.3 volumes of 10%, by weight, sodium hydroxide solution per volume of anion exchange resin in the bed. The bed was then used for the purification of adiponitrile having the same acidity as before, and acidity appeared in the effluent adiponitrile from the bed after contacting the resin bed with 35 volumes of adiponitrile per volume of resin in the bed. This loss in purification capacity of the anion exchange bed was equal to 44%. Following this purification cycle the anion exchange resin bed was defouled by contacting the bed with 3.1 volumes of a 1 N ammonium sulfate solution per volume of anion exchange resin in the bed, and then 3.1 volumes of 10%, by weight, sulfuric acid solution. The ammonium sulfate solution and the sulfuric acid solutions were contacted with the resin bed in a flow direction the same as to the normal flow of the adiponitrile therethrough, and following contact with these solutions, the bed was washed with water in a similar volume and flow direction. The ion exchange resin bed was then regenerated in a manner indentical to that of the regeneration used previously. Following the regeneration, 67 volumes of adiponitrile, having the same acidity content as before, per volume of anion exchange resin were purified with the bed before acidity appeared in the bed effluent adiponitrile.

The return of the anion exchange resin purification capacity to that equal to or slightly greater than the initial purification capacity of the bed demonstrates clearly the advantage of a defouling step in the ion exchange resin regeneration process of this invention.

The advantages of the process of this invention are clear. Ion exchange resins when regenerated in accordance with the process of this invention may be regenerated simply and economically and used repeatedly.

As many apparently widely different embodiments of this invention may be made without departing from the spirit and scope thereof, it is to be understood that we do not limit ourselves to the specific embodiments thereof except as defined in the appended claims.

We claim:
1. A process for regenerating strongly basic anion exchange resins comprising, in combination, the steps of:
   (a) reclassifying hydraulically a bed of strongly basic anion exchange resin having low ion exchange capacity,
   (b) contacting said reclassified anion exchange resin bed with a defouling solution of 2.5% to 10%, by weight, aqueous solution of mineral acid,
   (c) washing said defouled anion exchange resin bed with water at a rate sufficient to remove defouled suspended solids from said bed,
   (d) contacting said anion exchange resin bed with a regenerating solution of 4% to 10%, by weight, aqueous solution of caustic material, and
   (e) reclassifying said hydraulically regenerated resin bed for use as an anion exchange resin bed having substantially increased ion exchanged capacity.

2. The process defined in claim 1, wherein the step of contacting said resin with a defouling solution is preceded by salt treating said resin bed by contacting said bed with a solution selected from the group consisting of acidic and neutral salts, in a volume and concentration sufficient to provide stoichiometric salt equivalent to the theoretical capacity of the quantity of anion exchange resin in said bed.

3. A process for regenerating strongly basic anion exchange resins fouled and exhausted by contact with impure adiponitrile produced by reaction of adipic acid and ammonia, comprising in combination, the steps of:
   (a) reclassifying hydraulically a bed of said strongly basic anion exchange resin having low ion exchange capacity,
   (b) contacting said reclassified anion exchange resin bed with a defouling solution of 2.5% to 10%, by weight, aqueous solution of mineral acid,
   (c) washing said defouled anion exchange resin bed with water at a rate sufficient to remove defouled suspended solids from said bed,
   (d) contacting said anion exchange resin bed with a regenerating solution of 4% to 10%, by weight, aqueous solution of caustic material, and
   (e) reclassifying said hydraulically regenerated resin bed for use as an ion exchange resin bed having substantially increased ion exchange capacity.

4. The process defined in claim 3, wherein the step of contacting said resin with a defouling solution is preceded by salt treating said resin bed by contacting said bed with a solution selected from the group consisting of acidic and neutral salts, in a volume and concentration sufficient to provide stoichiometric salt equivalent to the theoretical capacity of the quantity of anion exchange resin in said bed.

5. A process for regenerating strongly basic anion exchange resins comprising in combination, the steps of:
   (a) reclassifying hydraulically a bed of strongly basic anion exchange resin having low ion exchange capacity,
   (b) contacting said reclassified anion exchange resin bed with a solution of 2.5% to 10%, by weight, aqueous solution of mineral acid,
   (c) washing said anion exchange resin bed with water at a rate sufficient to remove suspended solids from said bed,
   (d) contacting said anion exchange resin bed with a regenerating solution of 4% to 10%, by weight, aqueous solution of caustic material, and
   (e) reclassifying said hydraulically regenerated resin bed for use as an anion exchange resin bed having substantially increased ion exchange capacity.

6. The process defined in claim 5, wherein the step of contacting said resin with a basic solution is preceded by salt treating said resin bed by contacting said bed with a solution selected from the group consisting of acidic and neutral salts, in a volume and concentration sufficient to provide stoichiometric salt equivalent to the theoretical capacity of the quantity of anion exchange resin in said bed.

7. A process for regenerating strongly acidic cation exchange resins fouled and exhausted by contact with impure adiponitrile produced by reaction of adipic acid and ammonia, comprising in combination the steps of:
   (a) reclassifying hydraulically a bed of cation exchange resin having low ion exchange capacity,
   (b) contacting said bed with a defouling solution of 1.5% to 30%, by weight, ammonia in water,
   (c) washing said defouled bed with water at a rate sufficient to remove defouled suspended solids from said bed,
   (d) contacting said washed bed with a regenerating solution of a 4% to 10%, by weight, aqueous solution of a mineral acid, and
   (e) reclassifying said hydraulically regenerated bed for use as a cation exchange resin bed having substantially increased ion exchange capacity.

8. A process for regenerating strongly acidic cation exchange resins fouled and exhausted by contact with impure adiponitrile produced by reaction of adipic acid and ammonia, comprising in combination the steps of:
   (a) reclassifying hydraulically a bed of cation exchange resin having low ion exchange capacity,
   (b) contacting said bed with a defouling solution of 1.5% to 30%, by weight, ammonia in water and methanol,
   (c) washing said defouled bed with water at a rate sufficient to remove defouled suspended solids from said bed,
   (d) contacting said washed bed with a regenerating solution of a 4% to 10%, by weight, aqueous solution of a mineral acid, and
   (e) reclassifying said hydraulically regenerated bed for use as a cation exchange resin bed having substantially increased ion exchange capacity.

9. A process for regenerating strongly acid cation exchange resins, comprising in combination the steps of:
 (a) reclassifying hydraulically a bed of cation exchange resin having low ion exchange capacity,
 (b) contacting said bed with a defouling solution of 1.5 to 30%, by weight, ammonia in water,
 (c) washing said defouled bed with water at a rate sufficient to remove defouled suspended solids from said bed,
 (d) contacting said washed bed with a regenerating solution of a 4% to 10%, by weight, aqueous solution of a mineral acid, and
 (e) reclassifying said hydraulically regenerated bed for use as a cation exchange resin bed having substantially increased ion exchange capacity.

10. A process for regenerating strongly acid cation exchange resins, comprising in combination the steps of:
 (a) reclassifying hydraulically a bed of cation exchange resin having low ion exchange capacity,
 (b) contacting said bed with a defouling solution of 1.5% to 30%, by weight, ammonia in water and methanol,
 (c) washing said defouled bed with water at a rate sufficient to remove defouled suspended solids from said bed,
 (d) contacting said washed bed with a regenerating solution of a 4% to 10%, by weight, aqueous solution of a mineral acid, and
 (e) reclassifying said hydraulically regenerated bed for use as a cation exchange resin bed having substantially increased exchange capacity.

11. A process for regenerating strongly acidic cation exchange resins comprising in combination the steps of:
 (a) reclassifying hydraulically a bed of cation exchange resin having low ion exchanger capacity,
 (b) contacting said bed with a solution of 1.5% to 30%, by weight, ammonia in water,
 (c) washing said bed with water at a rate sufficient to remove suspended solids from said bed,
 (d) contacting said washed bed with a regenerating solution of a 4% to 10%, by weight, aqueous solution of a mineral acid, and
 (e) reclassifying said hydraulically regenerated bed for use as a cation exchange resin bed having substantially increased ion exchange capacity.

12. A process for regenerating strongly acidic cation exchange resins comprising in combination the steps of:
 (a) reclassifying hydraulically a bed of cation exchange resin having low ion exchange capacity,
 (b) contacting said bed with a solution of 1.5% to 30%, by weight, ammonia in water and methanol,
 (c) washing said bed with water at a rate sufficient to remove suspended solids from said bed,
 (d) contacting said washed bed with a regenerating solution of a 4% to 10%, by weight, aqueous solution of a mineral acid, and
 (e) reclassifying said hydraulically regenerated bed for use as a cation exchange resin bed having substantially increased ion exchange capacity.

References Cited by the Examiner

UNITED STATES PATENTS

| | | | |
|---|---|---|---|
| 2,767,140 | 10/1956 | Fitch | 210—33 |
| 3,032,395 | 5/1962 | Bowman | 210—30 |
| 3,048,635 | 8/1962 | Indest et al. | 260—583 |

OTHER REFERENCES

Kunin: Elements of Ion Exchange, copyright by Reinhold Publishing Corp., page 37 relied upon.

MORRIS O. WOLK, *Primary Examiner.*

E. G. WHITBY, *Assistant Examiner.*